J. STEINBERG.
PNEUMATIC TIRE FOR VEHICLE WHEELS.
APPLICATION FILED FEB. 9, 1911.

1,067,558.

Patented July 15, 1913.

Witnesses:

Inventor:
Jacques Steinberg
by his attorneys

UNITED STATES PATENT OFFICE.

JACQUES STEINBERG, OF PARIS, FRANCE.

PNEUMATIC TIRE FOR VEHICLE-WHEELS.

1,067,558.  Specification of Letters Patent. Patented July 15, 1913.

Application filed February 9, 1911. Serial No. 607,627.

*To all whom it may concern:*

Be it known that I, JACQUES STEINBERG, subject of the Emperor of Russia, and resident of 29 Rue Duret, Paris, in the Republic of France, manufacturer, have invented new and useful Improvements in Pneumatic Tires for Vehicle-Wheels, of which the following is a specification.

This invention relates to pneumatic tires for vehicle wheels of the type in which the inner tube or air chamber repairs or seals itself automatically after being punctured by nails, pieces of glass or other obstacles encountered on the road, for example, said air chamber being for this purpose composed of several layers of rubber vulcanized to different degrees of hardness and of an interior layer which has not been vulcanized at all and which remains in a pasty condition after heating. It has however been found difficult to place an air chamber of this kind in the removable cover which serves to protect it and to fix the cover on the rim of the wheel owing to the great thickness of the air chamber and its relative stiffness.

The object of the present invention is to obviate this difficulty and to facilitate the employment of self-sealing air chambers.

Now according to this invention the air chamber or inner tube is molded or formed of several layers in the known manner and so that a portion of the said inner tube which is adapted to lie close to the rim of the wheel, is formed with a depression or hollow extending all around the tube (that is to say the parts in the neighborhood of the smallest circumference of the inner tube) while the rest or greater part of the inner tube including its outer circumference is connected or attached by vulcanization or otherwise to the interior of the cover, the beads or the like and the adjoining parts of the outer cover being left free. This arrangement permits the beads or edges of the cover to approach each other sufficiently for passing easily between the inwardly turned edges or flanges of the rim and for easily putting on the tire. When the tire is in its place it may be inflated so that the air chamber assumes a more or less circular form and forces the beads into the hook-shaped parts of the rim.

Figure 1:
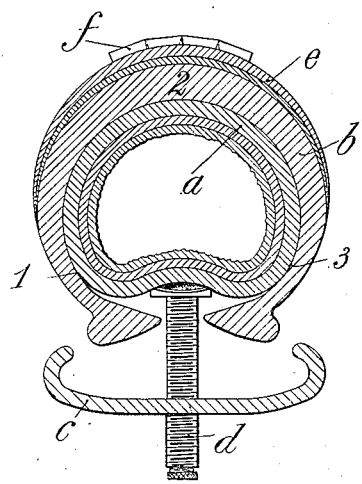
Figure 2:
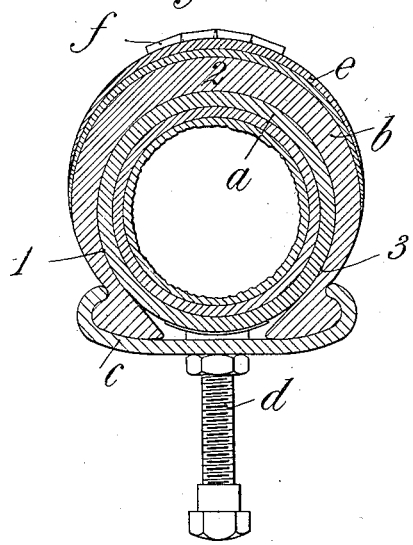

Figure 1 on the drawing is a transverse section of a tire made according to this invention, the air chamber being shown in the condition before it is inflated and with the beads as near to each other as the valve will permit in order that they may easily enter between the curved sides or flanges of the wheel rim. Fig. 2 is a transverse section showing the tire mounted on the wheel rim and inflated.

$a$ denotes the self-repairing or self sealing air chamber.

$b$ is the cover, $c$ the wheel rim, and $d$ is the valve for inflation. The air chamber is by vulcanization stuck or caused to adhere to the cover for the greater part of its circumference, for instance to the extent of an arc marked 1, 2, 3, while the smaller and inner part of the circumference is unattached as shown.

The tires made according to the present improvement may of course be mounted on a rim forming an integral part of the wheel, or on a removable rim. The tires may also if desired be provided with a non-slip or non-skid band or part of any kind so as to prevent side slip, such for instance as the one shown consisting of a crescent shaped piece $e$ of leather with rivets provided with projecting heads $f$.

Having now particularly described and ascertained the nature of my said invention and in what manner the same is to be performed, I declare that what I claim is:—

A pneumatic tire comprising a cover and an air chamber secured to the cover at its tread portion, the said air chamber being concave on its inner face whereby the margins of the cover are normally drawn toward each other when the tire is deflated for mounting on a wheel rim.

In testimony, that I claim the foregoing as my invention, I have signed my name in presence of two witnesses, this thirty first day of January 1911.

JACQUES STEINBERG.

Witnesses:
 DEAN B. MASON,
 ALCIDE FABE.